(12) United States Patent
Sogabe

(10) Patent No.: US 6,284,297 B1
(45) Date of Patent: Sep. 4, 2001

(54) METHOD FOR COLOR DEVELOPMENT OF A CRUSTACEAN AND COLORED-DEVELOPED CRUSTACEANS

(75) Inventor: Satoshi Sogabe, Kobe (JP)

(73) Assignee: Munesho Co., Ltd., Kobe (JP)

( * ) Notice: Subject to any disclaimer, the term of this patent is extended or adjusted under 35 U.S.C. 154(b) by 0 days.

(21) Appl. No.: 09/156,616

(22) Filed: Sep. 18, 1998

(30) Foreign Application Priority Data

Sep. 22, 1997 (JP) .................................................. 9-275329

(51) Int. Cl.⁷ ...................................................... A23L 1/33
(52) U.S. Cl. ............................ 426/262; 426/268; 426/643
(58) Field of Search .................................. 426/262, 268, 426/311, 332, 643, 652, 442

(56) References Cited

U.S. PATENT DOCUMENTS 3,365,302 * 1/1968 Vitulis .................................... 426/262

FOREIGN PATENT DOCUMENTS 6-7075 * 1/1994 (JP) .

OTHER PUBLICATIONS

Translation Japanese Patent Publication 6–7075, Jan. 1, 1994.*

* cited by examiner

Primary Examiner—Arthur L. Corbin
(74) Attorney, Agent, or Firm—Bacon & Thomas, PLLC

(57) ABSTRACT

A method for color development of a crustacean in a fresh state, comprising the steps of: treating a crustacean such as a lobster or a crab, in which a shell thereof is left as it is or removed, with an alkaline aqueous solution having a pH value in a range of from 10 to 14 to thereby develop the red color of a carotenoid pigment; and the treating the crustacean with an aqueous solution of an edible acid, such as an acetic acid, to thereby perform neutralization.

8 Claims, No Drawings

METHOD FOR COLOR DEVELOPMENT OF A CRUSTACEAN AND COLORED-DEVELOPED CRUSTACEANS

BACKGROUND OF THE INVENTION

1. Field of the Invention

The present invention relates to a method for developing the color of a crustacean such as a lobster, a crab, or the like, having a carotenoid pigment into red in a fresh state without heating, and relates to color-developed crustaceans.

2. Description of the Related Art

Crustaceans such as lobsters, crabs, etc. are popular foods because of their charming red external appearances and their deliciousness. Most of crustaceans however exhibit dark red, blue, purple or green in a fresh state, and do not turn into vivid red before they are heated. Human appetite is not stimulated before dark-color lobsters, crabs, etc. are color-developed into vivid red. Accordingly, generally, lobsters, crabs, etc. are color-developed by heating. With respect to the color development of lobsters, crabs, etc. by heating, it is considered that a pigment such as astaxanthine, or the like, which is a carotenoid pigment, is bonded to protein to thereby exhibit various color tones, and the pigment is liberated by heating so as to be color-developed into vivid red.

However, if a crustacean such as a lobster, a crab, or the like, is heated by means of boiling in water, steaming, or the like, in order to develop the color of the crustacean, protein in crustacean meat is denatured so that the quality of meat having sweetness and deliciousness peculiar thereto is quite deteriorated. Therefore, JP-A-61-242565 has proposed a method of so-called branching color development in which only the shell of a lobster is color-developed by boiling in a short time so that the quality of the meat inside the shell is kept as fresh as possible. Further, JP-A-63-129973 has disclosed a method for heating a crustacean such as a lobster, a crab, or the like, by far-infrared radiation under the presence of water vapor.

The conventional method for color development of a crustacean by boiling in a short time cannot be applied to a lobster such as "USHIEBI" (Penaeus monodon) which is generally called black tiger, or the like, and exhibits a dark color in a stripped fresh state. That is, because only the shell is color-developed, the surface of a stripped lobster cannot be color-developed into red by boiling while the quality of the meat inside the shell is kept fresh. If the surface of a stripped lobster inside the shell is color-developed by the conventional method, protein in the meat portion is necessarily denatured by heating so that the quality of the meat cannot be kept fresh. On the other hand, in the far-infrared heating method, the quality of the meat inside the shell is denatured by heating so that the quality of the meat cannot be kept fresh.

To color-develop the surface of a stripped crustacean exhibiting a dark color in a fresh state into vivid red while keeping the stripped crustacean fresh perfectly, therefore, Applicant of the present application has proposed, in Japanese Patent No. 2607204, a method for color development of a crustacean in a fresh state, comprising treating a crustacean such as a lobster, a crab, or the like, having a shell thereof left as it is or removed, with an alkaline aqueous solution to thereby develop the color of a carotenoid pigment into red.

However, if the method for color development of a crustacean disclosed in the Japanese Patent No. 2607204 is used, dark black spots appear in the surface of a stripped lobster which has been color-developed into red, when a short time is passed after the stripped lobster is color-developed into red in a fresh state. There arises a serious problem particularly in the case where dark black spots appear in a color-developed product a short time after a user has defrosted the color-developed product which had been frozen and shipped. Although the cause of the generation of such dark black spots is not yet clear, it is considered that the cause may be in the color-development chemicals remaining in the stripped body of a lobster, or the like.

Further, when a stripped lobster, or the like, which has been color-developed by the aforementioned method is subjected to a taste test, there is a case where the lobster meat is slightly bitter, resulting in some problem in taste.

SUMMARY OF THE INVENTION

It is therefore an object of the present invention to provide a method for preventing dark black spots from appearing in the surface of a stripped body of a crustacean such as a lobster, a crab, or the like, when the crustacean is left for a short time after the crustacean which is treated with an alkaline aqueous solution so as to be color-developed.

It is another object of the present invention to provide a crustacean such as a lobster, a crab, or the like, which is treated with an alkaline aqueous solution so as to be color-developed while the crustacean is prevented from having slight bitter in its taste.

In order to achieve the foregoing objects, the present inventor has made research continuously eagerly. As a result, the inventor has found that it is possible to keep the color of the surface of a stripped crustacean red clearly while preventing dark black spots from appearing in the surface of the stripped crustacean even when a considerable time is passed after color development or even when the crustacean once frozen is defrosted, by the steps of: treating the crustacean such as a lobster, a crab, or the like, with ar alkaline aqueous solution; and treating the crustacean with an aqueous solution of an edible acid such as an acetic acid, or the like, to thereby perform neutralization so that the surface of the crustacean exhibits weak alkali, and the inventor has found that bitter taste slightly remaining in a stripped body of a lobster, or the like, can be eliminated to thereby provide excellent taste by immersing the color-developed stripped lobster in a weak concentration of a flavoring liquid consisting of sugar such as sucrose, or the like, having sweetness, and sodium chloride.

That is, in order to achieve the above objects, according to an aspect of the present invention, provided is a method for color development of a crustacean in a fresh state, comprising the steps of: treating a crustacean such as a lobster, a crab, or the like, in which a shell thereof is left as it is or removed, with an alkaline aqueous solution having a pH value in a range of from 10 to 14 to thereby develop the color of a carotenoid pigment into red; and treating the crustacean with an aqueous solution of an edible acid such as an acetic acid, or the like, to thereby perform neutralization up to the time when the surface of a stripped body of the crustacean exhibits weak alkali.

According to another aspect of the present invention, provided is a method for color development of a crustacean in a fresh state, comprising the steps of: treating a crustacean such as a lobster, a crab, or the like, in which a shell thereof is left as it is or removed, with an alkaline aqueous solution having a pH value in a range of from 10 to 14 to thereby develop the color of a carotenoid pigment into red; and treating the crustacean with an aqueous solution of an edible acid such as an acetic acid, or the like, to thereby perform neutralization up to the time when the surface of a stripped body of the crustacean exhibits a pH value in a range of from 7.5 to 10.

According to a further aspect of the present invention, provided is a method for color development of a crustacean in a fresh state, comprising the steps of: treating a crustacean such as a lobster, a crab, or the like, in which a shell thereof is left as it is or removed, with an alkaline aqueous solution having a pH value in a range of from 10 to 14 to thereby develop the color of a carotenoid pigment into red; and treating the crustacean, after washing or neutralizing, with a flavoring liquid consisting of an aqueous solution containing 2 to 15% by weight of sucrose or a concentration of sweetening sugar exhibiting like sweetness, and 1 to 6 % by weight of sodium chloride.

According to a still further aspect of the present invention, provided is a method for color development of a crustacean in a fresh state, comprising the steps of: treating a crustacean such as a lobster, a crab, or the like, in which a shell thereof is left as it is or removed, with an alkaline aqueous solution having a pH value in a range of from 10 to 14 to thereby develop the color of a carotenoid pigment into red; treating the crustacean with an aqueous solution of an edible acid such as an acetic acid, or the like, to thereby perform neutralization up to the time when the surface of a stripped body of the crustacean exhibits weak alkali; and treating the crustacean with a flavoring liquid consisting of an aqueous solution containing 2 to 15% by weight of sucrose or a concentration of sweetening sugar exhibiting like sweetness, and 1 to 6% by weight of sodium chloride.

According to another aspect of the present invention, provided is a color-developed crustacean in a fresh state, which is color-developed through treatment of a crustacean such as a lobster, a crab, or the like, with a shell thereof is left as it is or removed, with an alkaline aqueous solution having a pH value in a range of from 10 to 14 to thereby develop the color of a carotenoid pigment into red, and treatment of the crustacean with an aqueous solution of an edible acid such as an acetic acid, or the like, to thereby perform neutralization up to the time when the surface of a stripped body of the crustacean exhibits weak alkali.

According to a further aspect of the present invention, provided is a color-developed crustacean in a fresh state, which is color-developed through treatment of a crustacean such as a lobster, a crab, or the like, with a shell thereof is left as it is or removed, with an alkaline aqueous solution having a pH value in a range of from 10 to 14 to thereby develop the color of a carotenoid pigment into red, and treatment of the crustacean with an aqueous solution of an edible acid such as an acetic acid, or the like, to thereby perform neutralization up to the time when the surface of a stripped body of the crustacean exhibits a pH value in a range of from 7.5 to 10.

According to a still further aspect of the present invention, provided is a color-developed crustacean in a fresh state, which is color-developed through treatment of a crustacean such as a lobster, a crab, or the like, with a shell thereof is left as it is or removed, with an alkaline aqueous solution having a pH value in a range of from 10 to 14 to thereby develop the color of a carotenoid pigment into red, and treatment of the crustacean, after washing or neutralizing, with a flavoring liquid consisting of an aqueous solution containing 2 to 15% by weight of sucrose or a concentration of sweetening sugar exhibiting like sweetness, and 1 to 6% by weight of sodium chloride.

According to a further aspect of the present invention, provided is a color-developed crustacean in a fresh state, which is color-developed through treatment of a crustacean such as a lobster, a crab, or the like, with a shell thereof is left as it is or removed, with an alkaline aqueous solution having a pH value in a range of from 10 to 14 to thereby develop the color of a carotenoid pigment into red, treatment of the crustacean with an aqueous solution of an edible acid such as an acetic acid, or the like, to thereby perform neutralization up to the time when the surface of a stripped body of the crustacean exhibits weak alkali, and treatment of the crustacean with a flavoring liquid consisting of an aqueous solution containing 2 to 15% by weight of sucrose or a concentration of sweetening sugar exhibiting like sweetness, and 1 to 6% by weight of sodium chloride.

DESCRIPTION OF THE PREFERRED EMBODIMENTS

All edible crustaceans such as lobsters, crabs, etc. can be treated as crustaceans to be treated by the method for color development according to the present invention. Particularly, the method according to the present invention is suitable for treating shrimp such as "USHIEBI" (Penaeus monodon), "KUMAEBI" (Penaeus semisulcatus), "FUTOMIEZOEBI" (Penaeus latisulcatus), "KURU-MAEBI" (Penaeus japonicus), etc., exhibiting dark brown in a fresh state.

The alkaline aqueous solution used in the color development method according to the present invention is an aqueous solution of a chemical compound which is selected from the group of a metal hydroxide, an alkali-metal salt, an alkali-earth metal salt, and other salts, and which exhibits alkali when it is dissolved in water. It is necessary that the safety of the chemical compound as food can be maintained perfectly even in the case where a small amount of the chemical compound remains in food at the worst.

Examples of the component of the alkaline aqueous solution which may be used in the color development method according to the present invention include a potassium carbonate, a potassium hydrogen carbonate, a potassium hydroxide, a calcium hydroxide, a sodium carbonate, a sodium hydrogen carbonate, a sodium hydroxide, a magnesium carbonate, an ammonium carbonate, a sodium phosphate, a potassium phosphate, an ammonium phosphate, a disodium hydrogen phosphate, a dipotassium hydrogen phosphate, a sodium polyphosphate, a potassium polyphosphate, a sodium metaphosphate, a potassium metaphosphate, a tetrasodium pyrophosphate, a tetrapotassium pyrophosphate, etc. Any one of these hydroxides and salts may be used singly or a mixture of two or more members suitably selected from these hydroxides and salts may be used.

The concentration of the hydroxide or salt aqueous solution is not lower than 0.01% by weight, though it varies in accordance with the kind of the hydroxide or salt aqueous solution. It is preferable that the pH value of the alkaline aqueous solution is set to be in a range of from 10 to 14, more preferably from 11 to 12. If the pH value is smaller than 10, color development does not occur. If the pH value is larger than 14, on the other hand, there is such a risk that protein in the meat portion of the crustacean may be denatured.

Although the color-developing treatment with an alkaline aqueous solution may be applied onto a crustacean having a shell left as it is, it is preferable to treat the crustacean as a stripped crustacean with the shell thereof removed in order to develop the color of the surface of the stripped crustacean. The alkaline aqueous solution may be sprayed to the crustacean or the crustacean may be immersed in the alkaline aqueous solution. The treating time, which varies in accordance with the kind and concentration of the alkaline aqueous solution, is generally in a range of from 1 second to 60 minutes. It is preferable to set the treating time to be as short as possible in order to prevent the delicious components of crustacean meat from flowing out.

It is preferable to set the temperature for color developing treatment with an alkaline aqueous solution to be in a range of from 0° C. to 70° C. If the treatment is made for a long time at a temperature higher than 70° C., protein is denatured by heating so that the object of the invention to develop color in a fresh state cannot be achieved.

After the color-developed crustacean, or the like, treated with the alkaline aqueous solution is washed with water in a short time, the crustacean is treated with a neutralizing solution consisting of an acetic acid aqueous solution to thereby perform neutralization so as to bring the pH value into a range of from 7.5 to 10. The preferred concentration of the acetic acid aqueous solution is in a range of from 0.1 to 2.0% by weight. With respect to the neutralization, from the point of view of preventing generation of dark black spots, it is necessary that neutralization is not performed to make the stripped crustacean neutral but performed to make the stripped crustacean weak alkali. With respect to the degree of neutralization, it is preferable to perform neutralization so that the pH value measured in the surface of the stripped crustacean after wiping off the treating solution becomes in a range of from 7.5 to 10. More preferably, neutralization is performed so that the pH value of the surface after the neutralization becomes in a range of from 8.5 to 9.5. If neutralization is carried out to an extent that the pH value of the surface after the neutralization becomes smaller than 7.5, dark black spots cannot be prevented from appearing in the surface of the color-developed stripped crustacean. If the pH value of the surface after the neutralization exceeds 10, a large amount of alkali components remain in the stripped crustacean to exert influence on taste so that the crustacean is slight bitter.

The acid component of the neutralizing solution is not always limited to an acetic acid, but other edible organic or inorganic acids may be used. For example, although an organic acid such as a malic acid, a succinic acid, a citric acid, etc., or a hydrochloric acid, or the like, may be used, it is preferable to use an acetic acid from the point of view of taste, or the like, in the case where a small amount of the acid component remains after the treatment. Even in the case where any kind of acid is used, it is necessary that the final pH value of the surface of the stripped crustacean after the neutralizing treatment is adjusted to be in a range of from 7.5 to 10. The temperature for the neutralizing treatment is set to be in a range of from 0 to 40° C., preferably from 10 to 25° C., more preferably from 15 to 20° C. The time required for the neutralizing treatment, which varies in accordance with the kind and temperature of the neutralizing solution, is generally in a range of from 1 to 30 minutes, preferably from 5 to 15 minutes. The neutralizing treatment may be carried out by immersing the crustacean in two separate neutralization tanks successively. In this case, the total immersion time is set to a value as described above. If the time is too short, the inside of the stripped crustacean cannot be neutralized. If the time is too long, on the contrary, there is a risk that the delicious components of the crustacean may flow out so as to be lost.

Under the condition that the neutralizing treatment of a crustacean, such as a lobster, or the like, is limited in a weak alkali range, dark black spots can be prevented from appearing in the color-developed stripped crustacean even with the passage of time.

After the neutralized crustacean is washed with water in a short time, the crustacean is treated with a flavoring liquid containing 2 to 15% by weight of sucrose, and 1 to 6% by weight of sodium chloride. The sucrose concentration of the flavoring liquid is preferably set to be in a range of from 4 to 10% by weight, more preferably from 6 to 8% by weight, and the sodium chloride concentration of the flavoring liquid is more preferably set to be in a range of from 2 to 4% by weight. When flavoring liquids substantially having the same composition are put in two flavoring liquid tanks so that the crustacean to be treated with the flavoring liquid is immersed in the two tanks successively, the change of the final treating concentration of the flavoring liquid in the second tank can be reduced. The temperature used in the flavoring treatment is set to be in a range of from 0 to 40° C., preferably from 10 to 25° C. Generally, the time required for the flavoring treatment, which varies in accordance with the kind and temperature of the flavoring liquid, is set preferably to be in a range of from 10 to 30 minutes. If the time is too short, the flavoring liquid does not penetrate the stripped crustacean. If the time is too long, on the contrary, there is a risk that the delicious components of the crustacean may flow out so as to be lost.

The sweet component of the flavoring liquid is not always limited to sucrose. For example, it is possible to use a flavoring liquid prepared by adding the aforementioned concentration of sodium chloride to an aqueous solution containing a certain amount of another sugar exhibiting sweetness equivalent to the sweetness in the aforementioned concentration of the sucrose aqueous solution. If sucrose, especially granulated sugar as pure sucrose, is used, however, the sweetness is clear without slovenliness, so that unnatural taste is not added to the stripped crustacean treated with the flavoring liquid. Accordingly, granulated sugar as pure sucrose is most preferably used. Besides the aforementioned concentrations of sucrose or another sweet sugar and sodium chloride, any flavoring materials such as delicious flavoring materials, etc may be suitably added into the flavoring liquid.

By the treatment with the flavoring liquid, slight bitterness often recognized in the taste test after the color developing treatment of a crustacean such as a stripped lobster, or the like, is reduced so that the bitterness is little recognized in a sensual test.

In the case where a color-developed stripped crustacean is to be used as food immediately, the crustacean may be merely washed with water, without carrying out the strictly controlled neutralizing treatment to thereby remove the alkali component used in the color-developing treatment or the crustacean may be subjected to the conventional simple neutralizing treatment, before the flavoring treatment is carried out.

The color development method according to the present invention will be described more specifically on the basis of the following examples.

EXAMPLE 1

Stripped "USHIEBI" (Penaeus monodon) after separation of the shell thereof and removal of the intestine from the cut abdomen was sterilized with a food disinfectant. As the food disinfectant, used was a known food disinfectant such as a diluted sodium hypochlorite aqueous solution, or a diluted aqueous solution containing a hypochlorous acid prepared by non-separating-membrane electrolysis of a sodium chloride aqueous solution.

The stripped "USHIEBI" (Penaeus monodon) thus sterilized was preparatorily immersed, for about 30 seconds, in a color-developing preparatory tank filled with an aqueous solution of 5.0% by weight of potassium carbonate having the pH value of 12.0. Then, the stripped "USHIEBI" (Penaeus monodon) was immersed, for about 30 minutes, in a color-developing tank filled with an aqueous solution containing the same concentration of potassium carbonate so as to be color-developed. Then, the stripped "USHIEBI" (Penaeus monodon) was washed with flowing water for about 1 minute to thereby remove a large part of potassium carbonate. By this color-developing treatment, the surface of the stripped "USHIEBI" (Penaeus monodon) was color-developed into a red-striped pattern.

Then, the stripped "USHIEBI" (Penaeus monodon) thus color-developed was immersed, for about 30 seconds, in a preparatory neutralizing tank filled with an aqueous solution of 0.35% by weight of an acetic acid having the pH value of 3.0. Then, the stripped "USHIEBI" (Penaeus monodon) was immersed, for about 10 minutes, in a neutralizing tank filled with an aqueous solution containing the same concentration of the acetic acid. Thus, neutralization was performed so that the pH value of the surface of the stripped "USHIEBI" (Penaeus monodon) finally reached about 9. As a result, potassium carbonate penetrating into the stripped "USHIEBI" (Penaeus monodon) was substantially neutralized. Then, the stripped "USHIEBII" (Penaeus monodon) was washed with flowing water for about 1 minute.

Then, the stripped "USHIEBI" (Penaeus monodon) thus neutralized was immersed, for about 15 minutes, in a flavoring liquid containing 7% by weight of granulated sugar, and 3% by weight of sodium chloride. The resulting color-developed stripped "USHIEBI" (Penaeus monodon) was hydro-extracted, shaped, vacuumpacked and frozen to thereby form a product. In each of the steps of sterilization, color development, neutralization and flavoring, it is preferable to keep the temperature not higher than 20° C.

The frozen product of "USHIEBI" (Penaeus monodon) obtained in the aforementioned color-developing step was defrosted and left at 10° C. for 5 hours. As a result, dark black spots did not appear in the color-developed surface of the defrosted stripped "USHIEBI" (Penaeus monodon). The defrosted stripped "USHIEBI" (Penaeus monodon) was subjected to a taste test. As a result, there was little difference from the taste of a fresh stripped lobster, and bitterness was not recognized at all.

COMPARATIVE EXAMPLE 1

A stripped "USHIEBI" (Penaeus monodon) was sterilized, color-developed and then washed with flowing water for 30 minutes in quite the same manner as in Example 1. The color-developed stripped "USHIEBI" (Penaeus monodon) thus obtained was hydroextracted directly without neutralizing and flavoring treatments. Then, it was shaped, vacuum-packed and frozen. The frozen stripped "USHIEBI" (Penaeus monodon) was defrosted and left at 10° C. for 5 hours. As a result, small dark black spots appeared in the surface of the color-developed stripped "USHIEBI" (Penaeus monodon). The defrosted stripped "USHIEBI" (Penaeus monodon) was subjected to a taste test. As a result, slight bitterness was recognized.

COMPARATIVE EXAMPLE 2

A stripped "USHIEBI" (Penaeus monodon) was sterilized and color-developed in quite the same manner as in Example 1. After the stripped "USHIEBI" (Penaeus monodon) was then immersed in water for 1 minute, the stripped "USHIEBI" (Penaeus monodon) was immersed in a neutralizing tank filled with an aqueous solution of 2.0% by weight of acetic acid to thereby perform neutralization so that the pH value of the surface of the stripped "USHIEBI" (Penaeus monodon) reached about 6.5. Thus, potassium carbonate penetrating into the stripped "USHIEBI" (Penaeus monodon) was substantially neutralized. Then, the stripped "USHIEBI" (Penaeus monodon) was washed with flowing water for about 1 minute. The color-developed stripped "USHIEBI" (Penaeus monodon) thus obtained was directly hydro-extracted without neutralizing and flavoring treatments. Then, it was shaped, vacuum-packed and frozen. The frozen stripped "USHIEBI" (Penaeus monodon) was defrosted and left at 10° C. for 5 hours. As a result, a large number of dark black spots appeared in the surface of the color-developed stripped "USHIEBI" (Penaeus monodon).

EXAMPLE 2

The potassium carbonate aqueous solution used as the color-developing solution in Example 1 was replaced by an aqueous solution of 0.56% by weight of potassium hydroxide having the pH value of 12.0. A stripped "USHIEBI" (Penaeus monodon) was immersed in the thus prepared color-developing solution for 15 seconds so that the color-developing treatment was performed by using only one color-developing tank. Other conditions were made to be quite the same as in Example 1, and the sterilizing treatment, the color-developing treatment, the neutralizing treatment and the flavoring treatment were carried out successively. The color-developed stripped "USHIEBI" (Penaeus monodon) was once frozen, and then the frozen stripped "USHIEBI" (Penaeus monodon) was defrosted and tested in the same manner as in Example 1. As a result, dark black spots did not appear after defrosting, and bitterness was not recognized at all in a taste test.

COMPARATIVE EXAMPLE 3

A stripped "USHIEBI" (Penaeus monodon) was sterilized and color-developed in quite the same manner as in Example 2. After the stripped "USHIEBI" (Penaeus monodon) was then washed with water for 30 minutes, the stripped "USHIEBI" (Penaeus monodon) was once frozen directly without the neutralizing and flavoring treatments. The frozen stripped "USHIEBI" (Penaeus monodon) was defrosted and tested in the same manner as in Example 1. When the stripped "USHIEBI" (Penaeus monodon) was left at 10° C. for 5 hours after defrosting, a large number of dark black spots appeared in the surface of the color-developed stripped "USHIEBI" (Penaeus monodon). The defrosted stripped "USHIEBI" (Penaeus monodon) was subjected to a taste test. As a result, slight bitterness was recognized.

Although the aforementioned Examples have been described upon the case where "USHIEBI" (Penaeus monodon) is color-developed, the Examples can be applied also to other crustaceans such as lobsters, crabs, etc. having carotenoid pigments.

In the method for color development of a crustacean or other seafood according to the present invention, the surface of a stripped crustacean can be color-developed into red while the meat portion of the crustacean is kept fresh. Accordingly, edible lobsters or crabs vividly color-developed to stimulate human appetite can be obtained. In the case of "USHIEBI" (Penaeus monodon), or the like, the surface of the stripped lobster in a fresh state exhibits a dark color, so that human appetite is not stimulated. According to the present invention, a lobster unsuitable as food to be eaten in a fresh state for this reason can be changed into a lobster suitable as food to be eaten in a fresh state, because the surface of the stripped lobster can be color-developed into red while the stripped lobster is kept fresh.

Further, when the color development method according to the present invention is applied to a dark-color crustacean such as a lobster, or the like, having a carotenoid pigment, the color of the surface of the crustacean can be changed into a vivid color. If the color-developed crustacean is processed to salted crustacean guts, pickles, pickles in sake lees, etc., a fresh processed marine product being free from heating and having a color stimulating human appetite can be obtained without using any coloring materials.

In the method for color development of a crustacean, or the like, according to the present invention, the color-developed stripped lobster, or the like, is neutralized with a neutralizing solution so that the pH value of the surface of the stripped lobster is set in a range of from 7.5 to 10. Accordingly, after the stripped lobster is left as it is, or after the stripped lobster is once frozen and then defrosted, dark black spots do not appear in the surface of the stripped lobster color-developed into red.

In the method for color development of a crustacean, or the like, according to the present invention, the color-developed stripped lobster, or the like, is treated with a flavoring liquid containing sugar and salt. Then, there is no difference between the taste of the color-developed stripped lobster and the taste of a fresh stripped lobster not subjected to the color-developing treatment. That is, bitterness is not recognized at all in the color-developed stripped lobster.

The carotenoid pigment of a crustacean color-developed into vivid red by the color development method according to the present invention is stable so that the developed color is little changed by the change of the pH value, heating and other treatments thereafter.

What is claimed is:

1. A method for color development of a crustacean, in a fresh state, comprising the steps of: treating a crustacean, optionally with its shell, with an aqueous alkaline solution having a pH of from 10 to 14 to thereby develop a red color of a carotenoid pigment in the crustacean; and then treating said crustacean with an aqueous solution of an edible acid for a sufficient time to develop a weakly alkaline pH of 7.5 to 10 in the surface of said crustacean.

2. The method of claim 1 which further comprises treating the acudtreated crustacean, with a flavoring liquid comprising an aqueous solution containing 2 to 15% by weight of a sweetener and 1 to 6% by weight of sodium chloride.

3. The method of claim 2, where the crustacean is shrimp and the sweetener is sucrose.

4. The method of claim 1, wherein the crustacean is shrimp.

5. A red color-developed crustacean in a fresh state, which is color-developed through treatment of the crustacean, optionally having a shell, with an aqueous alkaline solution having a pH of from 10 to 14 to thereby develop the red color of a carotenoid pigment in the crustacean, which crustacean is then treated with an aqueous solution of an edible acid to develop in the surface of a of said crustacean a weakly alkaline pH of 7.5 to 10.

6. The red color-developed crustacean of claim 5 which is further treated with a flavoring liquid comprising an aqueous solution containing 2 to 15% by weight of a sweetener and 1 to 6% by weight of sodium chloride.

7. The colored developed crustacean of claim 6 which is shrimp and the sweetener is sucrose.

8. The red colored developed crustacean of claim 5 which is the shrimp.

* * * * *